United States Patent
Xu et al.

(10) Patent No.: US 10,153,499 B2
(45) Date of Patent: Dec. 11, 2018

(54) UNSYMMETRIC COMPACT METAL SEAL BEADS FOR FUEL CELL STACK

(71) Applicant: GM Global Technology Operations LLC, Detroit, MI (US)

(72) Inventors: Siguang Xu, Rochester Hills, MI (US); Ivan D. Chapman, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 429 days.

(21) Appl. No.: 14/861,239

(22) Filed: Sep. 22, 2015

(65) Prior Publication Data

US 2017/0084929 A1 Mar. 23, 2017

(51) Int. Cl.

| H01M 8/0276 | (2016.01) |
| H01M 8/0282 | (2016.01) |
| H01M 8/0286 | (2016.01) |
| H01M 8/026  | (2016.01) |
| H01M 8/2465 | (2016.01) |
| H01M 8/0267 | (2016.01) |
| H01M 8/1018 | (2016.01) |

(52) U.S. Cl.
CPC ....... *H01M 8/0282* (2013.01); *H01M 8/0267* (2013.01); *H01M 8/0276* (2013.01); *H01M 8/0286* (2013.01); *H01M 8/2465* (2013.01); *H01M 8/026* (2013.01); *H01M 2008/1095* (2013.01)

(58) Field of Classification Search
None
See application file for complete search history.

(56) References Cited

U.S. PATENT DOCUMENTS

| 5,776,624 A  | 7/1998 | Neutzler |
| 7,186,476 B2 | 3/2007 | Rock |
| 8,371,587 B2 | 2/2013 | Fly et al. |
| 8,679,697 B1 | 3/2014 | Skala |

FOREIGN PATENT DOCUMENTS

| CN | 101540401 A    | 9/2009 |
| CN | 102479966 A    | 5/2012 |
| CN | 102544519 A    | 7/2012 |
| DE | 202014004456 U1 | 5/2015 |
| JP | 2010073622 A   | 4/2010 |

*Primary Examiner* — Jonathan Crepeau
(74) *Attorney, Agent, or Firm* — Quinn IP Law (57) ABSTRACT

A bipolar plate assembly and fuel cell stack with reduced leakage and a method of assembling a bipolar plate and fuel cell stack. The bipolar plates include—in addition to reactant channels and coolant channels that are fluidly coupled to inlet and outlet flowpaths, integrally-formed seals to help reduce leakage by maintaining fluid isolation of the reactants and coolant as they flow through their respective channels and flowpaths. The size and shape of the seals promotes secure plate-to-plate contact, even during plate side-to-side misalignment that can occur when arranging the various plates into the stack.

17 Claims, 7 Drawing Sheets

UNSYMMETRIC COMPACT METAL SEAL BEADS FOR FUEL CELL STACK

BACKGROUND OF THE INVENTION

The present invention relates generally to an apparatus and method for improved sealing within bipolar plates used in a fuel cell assembly, and more particularly to the use of improved metal bead seals with compact designs and non-symmetric stacking arrangements.

Fuel cells convert a fuel into usable electricity via electrochemical reaction. A significant benefit to such an energy-producing means is that it is achieved without reliance upon combustion as an intermediate step. As such, fuel cells have several environmental advantages over internal combustion engines (ICEs) for propulsion and related motive applications. In a typical fuel cell—such as a proton exchange membrane or polymer electrolyte membrane (in either event, PEM) fuel cell—a pair of catalyzed electrodes are separated by an ion-transmissive medium (such as Nafion™) in what is commonly referred to as a membrane electrode assembly (MEA). The electrochemical reaction occurs when a first reactant in the form of a gaseous reducing agent (such as hydrogen, $H_2$) is introduced to and ionized at the anode and then made to pass through the ion-transmissive medium such that it combines with a second reactant in the form of a gaseous oxidizing agent (such as oxygen, $O_2$) that has been introduced through the other electrode (the cathode); this combination of reactants form water as a byproduct. The electrons that were liberated in the ionization of the first reactant proceed in the form of direct current (DC) to the cathode via external circuit that typically includes a load (such as an electric motor, as well as various pumps, valves, compressors or other fluid delivery components) where useful work may be performed. The power generation produced by this flow of DC electricity can be increased by combining numerous such cells into a larger current-producing assembly. In one such construction, the fuel cells are connected along a common stacking dimension—much like a deck of cards—to form a fuel cell stack.

In such a stack, adjacent MEAs are separated from one another by a series of reactant flow channels, typically in the form of a gas impermeable bipolar plate that—in addition to promoting the conveyance of reactants, coolant and byproducts—provides structural support for the MEA, as well as electrical current collection or conveyance and cell-to-cell sealing. In one common form, a typical automotive fuel cell stack may employ 100 or more bipolar plates, where the channels defined therein are of a generally serpentine layout that covers the majority of the opposing generally planar surfaces of each plate. The juxtaposition of the plate and MEA promotes the conveyance of one of the reactants to or from the fuel cell, while additional channels (that are fluidly decoupled from the reactant channels) may also be used for coolant delivery. In one configuration, the bipolar plate is itself an assembly formed by securing a pair of thin metal sheets (called half-plates, or more simply, plates) that have the channels stamped or otherwise integrally formed on their surfaces to promote fluid engagement. The various reactant and coolant flowpaths formed by the channels on each side typically convene at a manifold (also referred to herein as a manifold region or manifold area) defined on one or more opposing edges of the plate. Examples of all of these features—as well as a typical construction of such bipolar plate assemblies that may be used in PEM fuel cells—are shown and described in commonly-owned U.S. Pat. Nos. 5,776,624, 7,186,476 and 8,679,697, the contents of which are hereby incorporated by reference.

In a typical bipolar plate construction, a single plate assembly is formed from individual stamped plate layers that are welded or otherwise secured together, resulting in a laminated structure that defines the various fluid passages, support structures and electrically conductive surfaces. Historically, the sealing function around the plate manifolds, active area and fluid passages is achieved in one way through the use of separate gasket or seal assemblies where the underlying plate acts as a carrier, while in another way through cure-in-place (CIP) sealing materials placed between the adjacent plate layers during the assembly process.

Unfortunately, commercial automotive fuel cell applications require high volume manufacturing solutions that can produce 10,000 to 100,000 fuel cell stacks per year. Given that each cell requires a bipolar plate assembly on both opposing surfaces of the MEA, even low volume production would require more than a million plates be made. As such, both the CIP-based and gasket-based sealing approaches would be a cost-prohibitive way to achieve the sealing methods needed to reduce reactant or coolant channel flow losses, and as such are not suitable for high volume bipolar plate production.

To overcome some of the cost and manufacturing issues related to these sealing approaches, the Assignee of the present invention has developed integrally-formed bipolar plate sealing where the plate surfaces are stamped to produce outward-projecting metal bead seals (MBS) to establish discreet contact points between adjacent plate surfaces. While such a configuration is more compatible with the high-volume production needs mentioned above, their generally mirror-image (i.e., symmetrical) placement about a common plane that lies orthogonal to a plate stacking axis, coupled with their relatively large MBS width and the inherent manufacturing and assembly tolerances, has made them particularly susceptible to misalignment a crowning problems during fuel cell stack formation. In particular, under the compressive forces used in the stack assembly process, the flat MBS tops lead to the formation of concave-shaped regions within the adjacent MBS sealing surfaces rather than the intended (and generally uniform) face-to-face deformation. This in turn causes the contact pressure to be highly unevenly distributed on the seal surface, with high pressure at the edge and low pressure in the middle, resulting in reducing the effective seal surface contact area and lowering the ability of the MBS to perform its intended sealing function. To correct for the ensuing tendency to leak, other non-ferrous seal methods have to be used, such as through the use of generally complaint seals that significantly add to the cost of the assembled stack in a manner generally similar to the CIP approach discussed above.

SUMMARY OF THE INVENTION

The present inventors have found that rather than trying to avoid the inevitable concave shape formation in the MBS when two adjacent plates are joined, it is preferable to introduce a complementary-shaped convex surface shape to one side of the adjacent MBS pair so that the convex shaped surface will fit in a nesting fashion into the deformed concave shape of the other side of seal bead pair. This will result in a more uniform contact pressure that in turn will lead to a more uniform contact distribution along the joined MBS seal surface, as well as a concomitant reduction in leakage of the reactant or coolant fluid being routed through the flow channels. This cooperation of mating concave and convex surfaces will help reduce misalignment during assembly process.

According to a first aspect of the present invention, a fuel cell bipolar plate assembly is disclosed where each plate defines a fluid-engaging surface onto which either reactant channels or coolant channels are formed, depending on which fluid (i.e., reactant or coolant) is being conveyed across the plate surface. Inlet and outlet flowpaths are also defined in the surface such that each are in fluid communication with a respective one of the reactant and coolant channels; at least one seal or MBS is disposed on the surface such that upon cooperative engagement with an adjacently-placed one of the plates, the seal provides substantial fluid isolation of a reactant or coolant that is being conveyed through a respective one of the reactant and coolant channels. The MBS is an integrally-formed metal seal bead projecting from at least one of the surfaces of each of the pair of plates such that upon cooperative engagement between the pair of plates, the beads contact to provide substantial fluid isolation of a reactant or coolant that is being conveyed through a respective one of the reactant and coolant channels. Significantly, the beads define both (a) an unsymmetric contact about a common plane that lies orthogonal to a stacking axis defined by the pair of plates, and (b) a limited set of bead dimensions. Regarding the latter, in one form, a contact area defined by at least one of the beads includes a bead width of less than about 0.5 millimeters and a radius of curvature subtended by the width of less than about 2.0 millimeters. In one preferred form, there are no intervening seals (such as elastomeric seals, microseals or the like) disposed between the adjacent beads; in this way, there is direct contact between adjacent beads such that the inherent elastic deformation experienced between the adjacent beads is sufficient to achieve the desired coolant or reactant flow leakage reduction and related fluid isolation. In an alternate form, a thin layer microseal (or subgasket) may be used add to the sealability of the MBS. Such a microseal is preferably no more than about 10 μm in thickness.

According to another aspect of the present invention, a fuel cell stack includes numerous fuel cells arranged in a substantially facing configuration along a stacking axis, each of the cells within the system made up of an MEA and a bipolar plate assembly placed in fluid cooperation with the MEA. The plate assembly includes a pair of plates each having a pair of substantially planar opposing surfaces at least one of which defines a reactant channel or a coolant channel formed therein, and an integrally-formed MSB projecting from at least one of the plate surfaces of each of the pair of plates. Fluid delivery conduit is cooperative with the fuel cells to ensure that suitable anode reactants, cathode reactants or coolant is conveyed through the cells of the stack. A housing is placed around the stacked cells to keep the numerous bipolar plate assemblies in a compressive state; in this way, upon cooperative engagement between the pair of plates, the beads contact to provide substantial fluid isolation of a reactant or coolant that is being conveyed, thereby minimizing unintended leakage through the stack. The beads define both an unsymmetric contact about a common plane, as well as limited surface area contact of at least one of the two joined beads.

According to yet another aspect of the present invention, a method of sealing a bipolar plate within a fuel cell system is disclosed. The method includes placing at least a pair of plates of a bipolar plate assembly on top of one another in a stacked configuration where each of the pair of plates defines a pair of substantially planar opposing surfaces where at least one of the surfaces includes one or both of a reactant channel or a coolant channel formed therein. In addition, at least one of the surfaces includes an integrally-formed MSB that projects out of the plate plane such that when two adjacent plates are joined into adjacently-facing contact with one another, the point of contact between the MBS provide substantial fluid isolation of a subsequently-introduced reactant or coolant that is designed to flow through a respective one of the reactant and coolant channels. The contact is both unsymmetric about a common interfacial plane that lies orthogonal to a stacking axis defined by the pair of plates, and of limited size. Regarding this second contact criteria, the contact area includes an MBS with a width of less than about 0.5 millimeters and a radius of curvature subtended by the width of less than about 2.0 millimeters. The other MBS includes a generally planar or slightly concave surface that is larger than the other MBS such that upon contact between the two, the joined MBS pair can tolerate a relatively large amount of lateral misalignment of its corresponding plate, as the smaller contact width of the former MBS has relatively large margins where such secure point of contact is preserved. The plates are compressed together along a stacking axis such that at least one of the beads experiences elastic deformation to effect the substantial secure contact and resultant fluid isolation of the subsequently-introduced reactant or coolant. Significantly, the smaller cross section of the bead will reduce the amount of coolant flowing through the bead, thereby increasing the cooling efficiency around bead area. The smaller bead section can also help eliminate the use of coolant flow blocker, thereby further saving cost.

These and other aspects or embodiments will become apparent to those of ordinary skill in the art from a reading of the following detailed description and the appended claims.

BRIEF DESCRIPTION OF THE DRAWINGS

The following detailed description of the preferred embodiments of the present invention can be best understood when read in conjunction with the following drawings, where like structure is indicated with like reference numerals and in which the various components of the drawings are not necessarily illustrated to scale.

DETAILED DESCRIPTION OF THE EMBODIMENTS

Figure 1:
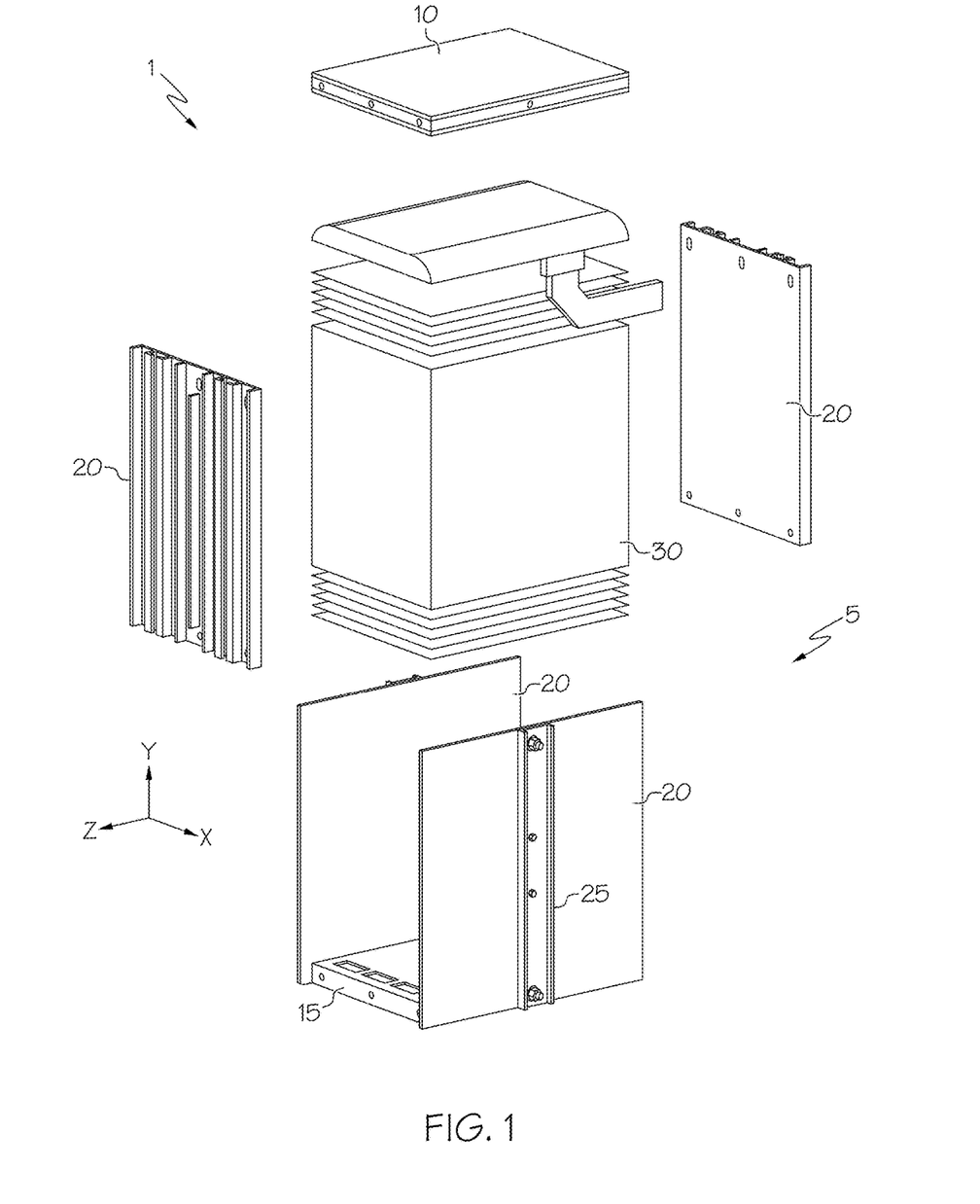
FIG. 1 depicts a schematic exploded view of a fuel cell stack according to an aspect of the present invention.
Figure 2:
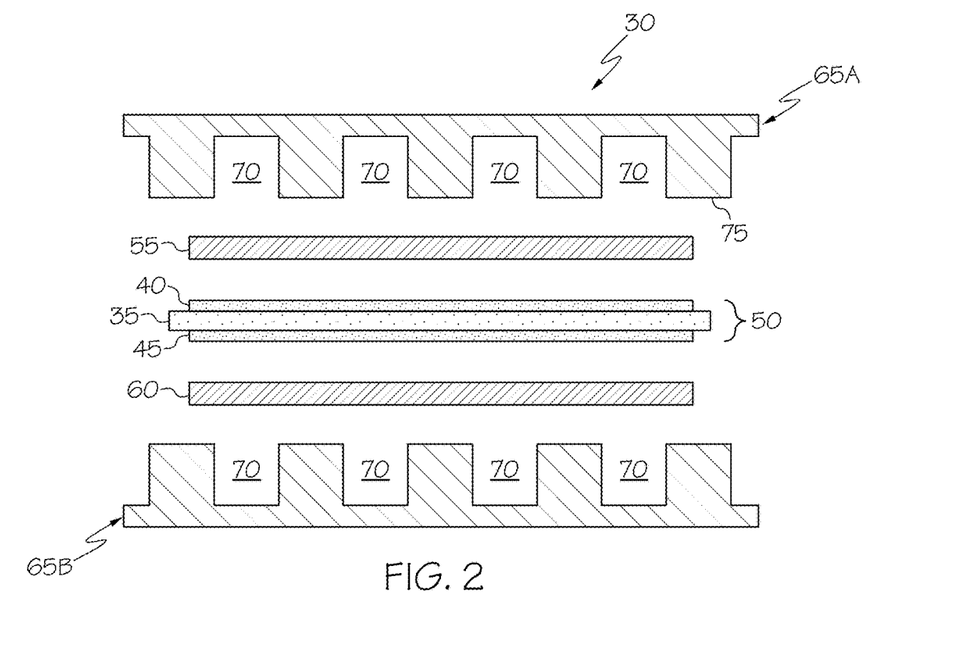
FIG. 2 is a simplified illustration of a partially exploded, sectional view of a portion of a fuel cell from the stack of FIG. 1 where the cell includes surrounding bipolar plates.
Figure 3:
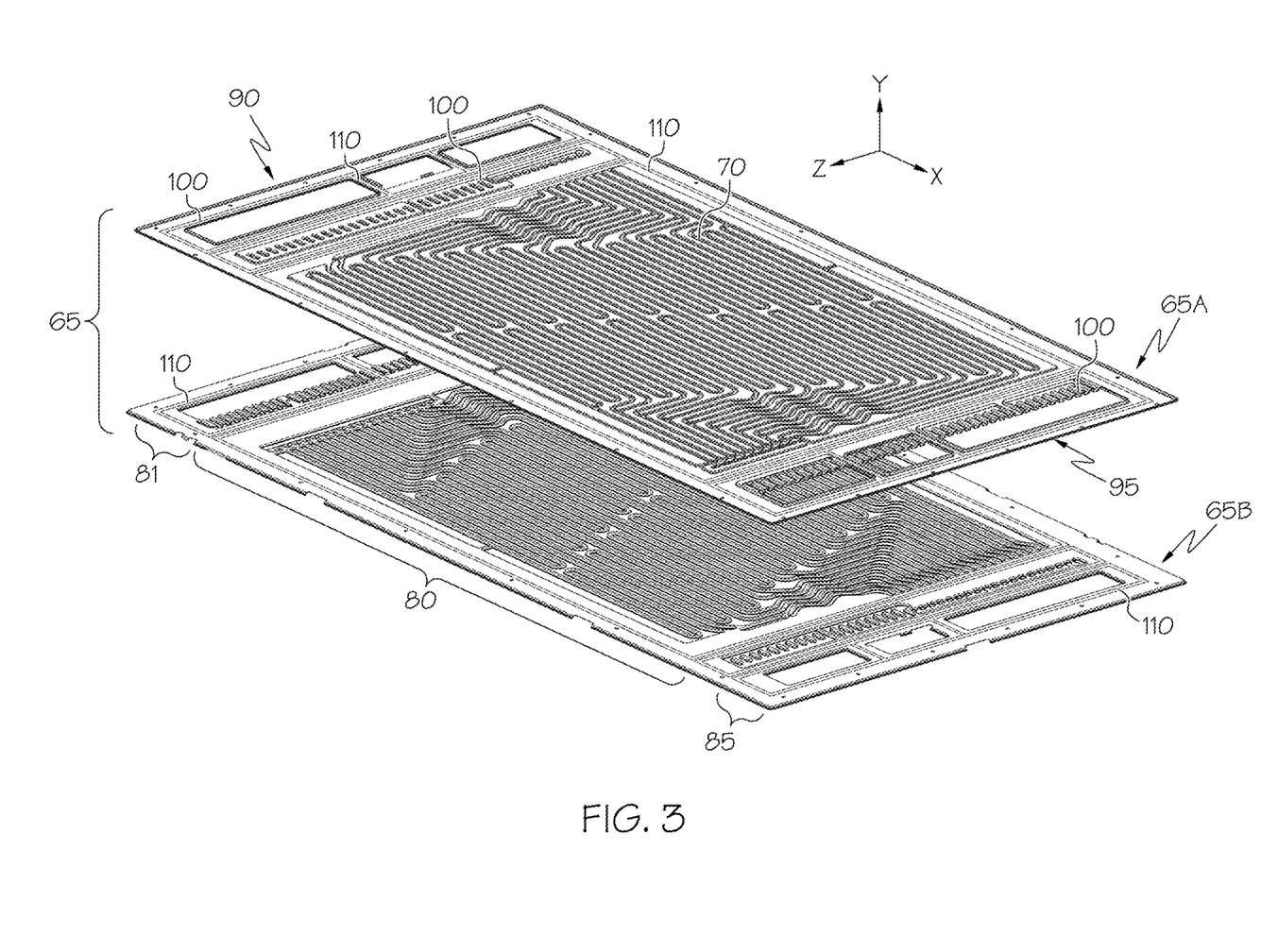
FIG. 3 is an exploded perspective detailed view of a bipolar plate assembly from FIG. 1 that includes an MBS.

Referring initially to FIGS. 1 through 3, a simplified view of fuel cell stack in exploded form (FIG. 1), a PEM fuel cell (FIG. 2) and a bipolar plate assembly (FIG. 3) are shown. The stack 1 includes a housing 5 made up of a dry end unit plate 10 and a wet end unit plate 15; these (as well as others, not shown) may help perform the compressive clamping action of the compression retention system of the housing 5; such compression retention system includes numerous bolts (not shown) that extend through the thickness of the stack 1, as well as various side panels 20 and rigid bracketing elements 25 disposed vertically along the stacking direction (the Y axis) for securing the wet end unit plate 15 to the dry end unit plate 10. Stacks of numerous fuel cells 30 are securely held in a compressive relationship along the stacking direction by the action of the bolts, bracketing elements 25 and other components within housing 5. Thus, in the present context, the stacking axis of the fuel cell 1 may be along a substantially vertical (i.e., Y) Cartesean axis so that the majority of the surface of each of the fuel cells 30 is in the X-Z plane. Regardless, it will be appreciated by those skilled in the art that the particular orientation of the cells 30 with their bipolar plates 65 and stack 1 isn't critical, but rather provides a convenient way to visualize the landscape that is formed on the surfaces of the individual plates that are discussed in more detail below.

The fuel cell 30 includes a substantially planar proton exchange membrane 35, anode catalyst layer 40 in facing contact with one face of the proton exchange membrane 35, and cathode catalyst layer 45 in facing contact with the other face. Collectively, the proton exchange membrane 35 and catalyst layers 40 and 45 are referred to as the MEA 50. An anode diffusion layer 55 is arranged in facing contact with the anode catalyst layer 40, while a cathode diffusion layer 60 is arranged in facing contact with the cathode catalyst layer 45. Each of diffusion layers 55 and 60 are made with a generally porous construction to facilitate the passage of gaseous reactants to the catalyst layers 40 and 45. Collectively, anode catalyst layer 40 and cathode catalyst layer 45 are referred to as electrodes, and can be formed as separate distinct layers as shown, or in the alternate (as mentioned above), as embedded at least partially in diffusion layers 55 or 60 respectively, as well as embedded partially in opposite faces of the proton exchange membrane 35.

In addition to providing a substantially porous flowpath for reactant gases to reach the appropriate side of the proton exchange membrane 35, the diffusion layers 55 and 60 provide electrical contact between the electrode catalyst layers 40, 45 and a bipolar plate assembly 65 that in turn acts as a current collector. Moreover, by its generally porous nature, the diffusion layers 55 and 60 also form a conduit for removal of product gases generated at the catalyst layers 40, 45. Furthermore, the cathode diffusion layer 60 generates significant quantities of water vapor in the cathode diffusion layer. Such feature is important for helping to keep the proton exchange membrane 35 hydrated. Water permeation in the diffusion layers can be adjusted through the introduction of small quantities of polytetrafluoroethylene (PTFE) or related material.

Although shown notionally as having a thick-walled structure, the individual plates 65A and 65B (also referred to herein as half-plates) that make up the assembly 65 preferably employ thin sheet-like or foil-like structure (as will be shown and described in more detail below); as such, FIG. 2 should not be used to infer the relative assembly 65 thickness. Simplified opposing surfaces defined by the facingly-adjacent half-plates 65A and 65B are provided to separate each MEA 50 and accompanying diffusion layers 55, 60 from adjacent MEAs and layers (neither of which are shown) in the stack 1. One half-plate 65A engages the anode diffusion layer 55 while a second half-plate 65B engages the cathode diffusion layer 60. The two thin, facing metal sheets that make up the half-plates 65A, 65B define—upon suitable compression and related joining techniques—an assembled plate 65. Each half-plate 65A and 65B (which upon assembly as a unitary whole would make up the bipolar plate 65) defines numerous reactant gas flow channels 70 along a respective plate face. Although bipolar plate 65 is shown (for stylized purposes) defining purely rectangular reactant gas flow channels 70 and surrounding structure, it will be appreciated by those skilled in the art that a more accurate (and preferable) embodiment will be shown below, where generally serpentine-shaped channels 70 are formed.

In operation, a first gaseous reactant, such as $H_2$, is delivered to the anode side of the MEA 50 through the channels 70 from half-plate 65A, while a second gaseous reactant, such as $O_2$ (typically in the form of air) is delivered to the cathode side of the MEA 50 through the channels 70 from half-plate 65B. Catalytic reactions occur at the anode 40 and the cathode 45 respectively, producing protons that migrate through the proton exchange membrane 35 and electrons that result in an electric current that may be transmitted through the diffusion layers 55 and 60 and bipolar plate 65 by virtue of contact between lands 75 and the layers 55 and 60. Related channels (not shown) may be used to convey coolant to help control temperatures produced by the fuel cell 1. In situations where the half-plates 65A, 65B are configured for the flow of coolant, their comparable features to their reactant-conveying plate counterparts; are of similar construction and will not be discussed in further detail herein.

Referring with particularity to FIG. 3, an exploded view showing two adjacently-stacked half-plates 65A, 65B to form the bipolar plate assembly is shown in more detail. In particular, the individual half-plates 65A, 65B each include both an active area 80 and a manifold area 85, where the former establishes a planar facing relationship with the electrochemically active area that corresponds to the MEA 50 and diffusion layers 55 and 60 and the latter corresponds an edge (as shown) or peripheral (not shown) area where apertures formed through the plates 65A, 65B may act as conduit for the delivery and removal of the reactants, coolant or byproducts to the stacked fuel cells 30. As can be seen from the exploded view of FIG. 3, these two half-plates 65A, 65B may be used to form a sandwich-like structure with the MEA 50 and anode and cathode diffusion layers 55, 60 and then repeated as often as necessary to form the fuel cell stack 1. In one form, one or both of the anode half-plate 65A and cathode half-plate 65B are made from a corrosion-resistant material (such as 304 SS or the like). The generally serpentine gas flow channels 70 form a tortuous path from near one edge 90 that is adjacent one manifold area 85 to near the opposite edge 95 that is adjacent the opposing manifold area 85. As can be seen, the reactant (in the case of a plate 65A, 65B placed in facing relationship with the MEA 50) or coolant (in the case of a plate 65A placed in facing relationship with the back of another plate 65B where coolant channels are formed) is supplied to channels 70 from a series of repeating gates or grooves that form a header 100 that lies between the active area 80 and the manifold area 85 of one (for example, supply) edge 90; a similar configuration is present on the opposite (for example, exhaust) edge 95. In an alternate embodiment (not shown), the supply and exhaust manifold areas can lie adjacent the same edge (i.e., either 90 or 95). In situations where the individual plates 65A, 65B are made from a formable material (such as the aforementioned stainless steel) the various surface features (including the grooves, channels or the like) are preferably stamped through well-known techniques, thereby ensuring that both the channels 70 and their respective structure, in addition to the MBS (which will be discussed in more detail below) are integrally formed out of a single sheet of material.

Figure 4:
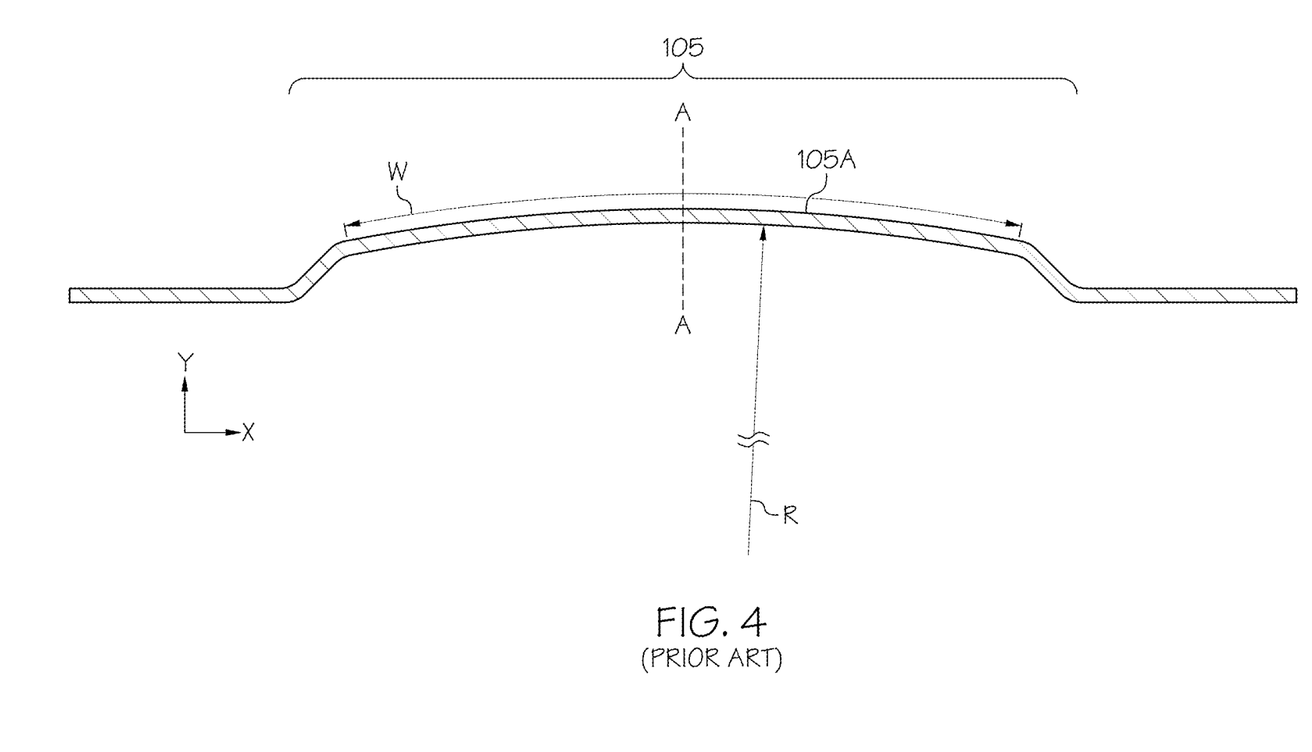
FIG. 4 shows a cross-sectional widthwise view of an MBS according to the prior art.

Referring next to FIG. 4, a cross sectional view showing the widthwise dimension of an MBS 105 according to the prior art of commonly-owned U.S. Pat. No. 8,371,587 includes an engaging surface 105A that is substantially symmetric with an arcuate shape about a center line A-A. Significantly, the radius of curvature R and the bead width W both employ relatively large dimensions, where the former is between 0.5 millimeters and 5.0 millimeters and the latter is between 2.0 millimeters and 100 millimeters. While such dimensions permit a higher degree of elastic response relative to a conventional bead seal, the present inventors have discovered that changes in the stack 1 height where numerous individual cells 30 are involved is still prone to reactant or coolant leakage, especially once the wide temperature and humidity variations that an operating fuel cell stack 1 are accounted for. The present inventors have further discovered that additional bead resiliency must be provided in order to keep such leakage conditions at bay.

Referring next to FIGS. 5A through 6C, a point of contact C between two unsymmetrically-stacked MBS 110 (shown as an upper MBS 110A and a lower MBS 110B) according to various embodiments of the present invention are shown as defining an engaging surface between the two plates 65A, 65B. In the version depicted with particularity in FIGS. 5A and 5B, both MBS 110A and 110B define the same profile, where the crown of the lower MBS 110B is relatively wide and planar, while the crown of the upper MBS 110A is relatively narrow and defines a radius of curvature R terminating at a tip T such that the point of contact C is formed where the two MBS 110A, 110B meet. Importantly, the present inventors have determined that keeping the radius of curvature R small helps to promote larger moments of inertia and stiffness in the tip T of the plate 65A that is meant to experience less (or substantially no) deforming upon stack 1 formation. Likewise, in embodiments (such as that depicted in FIG. 6C) where the radius of curvature R is permitted to be slightly larger (but still less than about 2.0 millimeters), it still exhibits less of a tendency to deform during stack 1 compression than the planar crown of the other MBS 110B, thereby still promoting the nested or cupped relationship. Importantly, the present inventors have determined that the selection of the radius of curvature R is based on the MBS 110 stiffness requirement, usable compression range, material used and other bead plan-view and section view geometries, and that for a stainless steel MBS 110 of the sizes and material choices depicted herein, the radius of curvature R should be less than 2.0 mm.

As with the grooves, channels and other features mentioned above, the MBS 110 may be formed by stamping or other forming operations, and are shaped to provide fluidly-isolatable regions around the various inlets, outlets and serpentine channels that make up the various regions that are formed over the surface of the bipolar plate 65. As shown, the MBS 110 is notionally about one mm wide and about 0.5 mm tall, where the slightly (i.e., at least partially) convex surface may add another 100 microns of overall height. A common plane 115 is formed between the adjacently-faced plates 65A, 65B, and in one form may include a microseal (which is not shown) and subgasket that is peripherally adjacent MEA 50, while in another form may include nothing such that direct contact between the MBS 110A, 110B of the respective plates 65A, 65B is formed.

Significantly, all of the MBS 110 configurations increases seal reliability due to the fact that the point of contact C between adjacent unsymmetric MBS 110 is less sensitive to the lateral (i.e., X-Z plane) misalignment M of adjacent plates 65A, 65B. This helps avoid the use of redundant materials (such as additional microseal, or additional plate sheet metal to make the bead wider, along with related manufacturing cost) at the interfacial region between the two abutting MBS 110. Moreover, the relatively simple geometric surfaces defined across the widths W of the MBS 110 help keep manufacturing costs low.

Figure 5A:
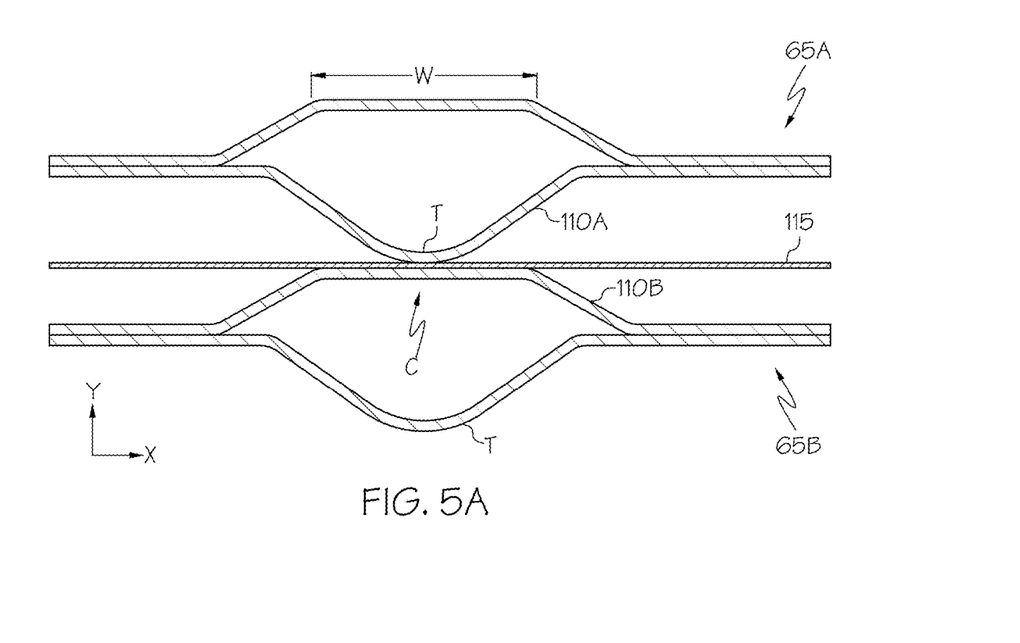
FIG. 5A shows the unsymmetric juxtaposition of two adjacent plate surfaces according to an aspect of the present invention such that a less compliant surface of one may nest into the more compliant surface of the other upon subsequent stack-compressing action.
Figure 5B:
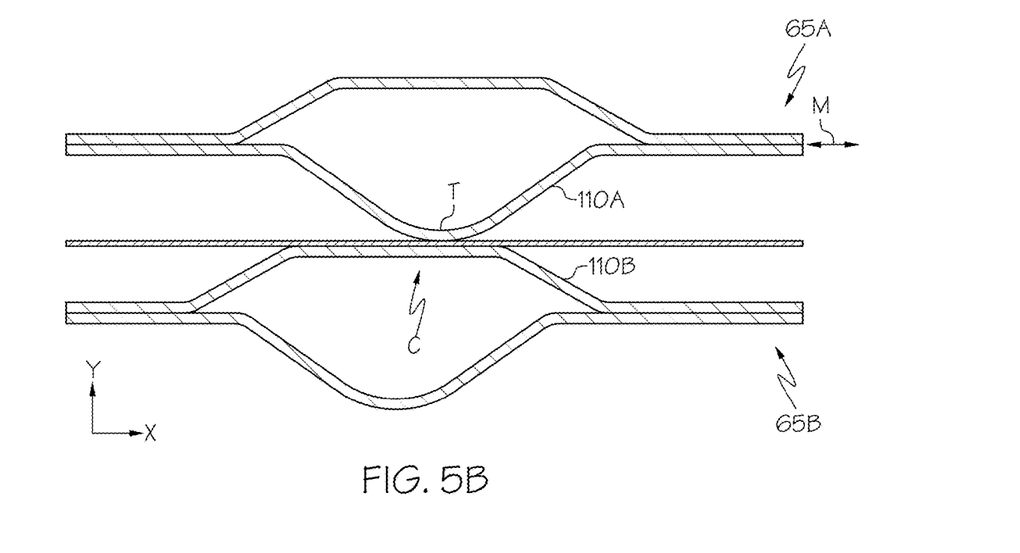
FIG. 5B shows how the effects of misalignment between the two adjacent plate surfaces of FIG. 5A are ameliorated.

Referring with particularity to FIG. 5B, lateral misalignment of one of the plates 65 relative to the other does not cause an appreciable loss in contact, as the relatively small width W of the upper MBS 110A with its relatively rigid tip T at the crown that is made possible by the increased moment of inertia (i.e., bending and compression stiffness) that results from the significant out-of-plane shaping will continue (under suitable stack compression of the various bipolar plates 65) to force the more compliant engaging surface of the crown of the lower MBS 110B to deform to form a nesting or other complementary fit. It will be appreciated that symmetric placement (not shown) of the joined MBS 110A, 110B is incapable of providing the same degree of coupling at the point of contact C insofar as almost any degree of misalignment between the adjacent plates 65A, 65B will not afford the necessary relative compliance from one of the engaging surfaces; such lack of compliance prevents the secure contact needed to provide the desired level of fluid isolation. Moreover, leaving a relatively wide width W for the tip T of the more rigid (i.e., 110A as shown in the figures) of the two MBS 110 affords far less ability to accommodate any lateral misalignment. Thus, in situations where the width W of the crown of both MBS 110A, 110B is relatively wide (for example, greater than about 0.5 millimeters), the chance of forming any complementary joining (such as by nesting or the like) between the two is hampered. As such, the present inventors have designed the adjacent MBS 110A, 110B to be placed in an unsymmetric stacked relationship relative to one another such that the difference in their engaging surface shapes and widths at the point of contact C can be exploited in order to form the secure, complementary fit between them.

Figure 6A:
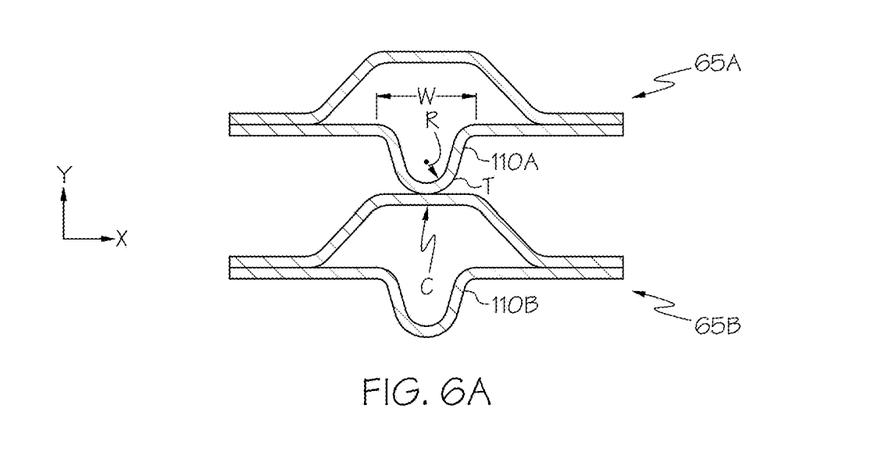
FIGS. 6A through 6C show alternate embodiments of the respective MBS surfaces according to additional aspects of the present invention.
Figure 6B:
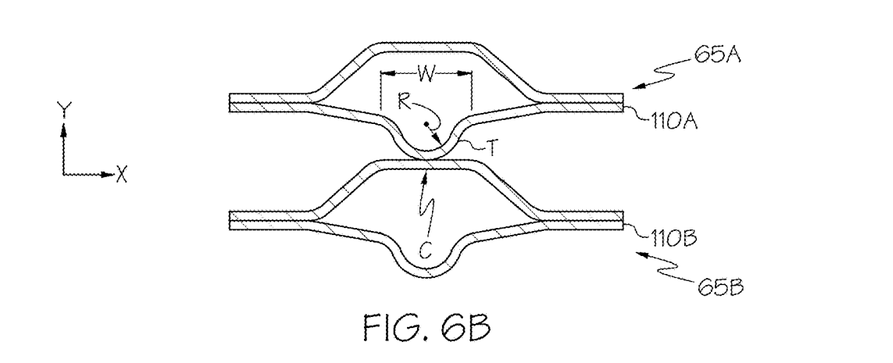
Figure 6C:
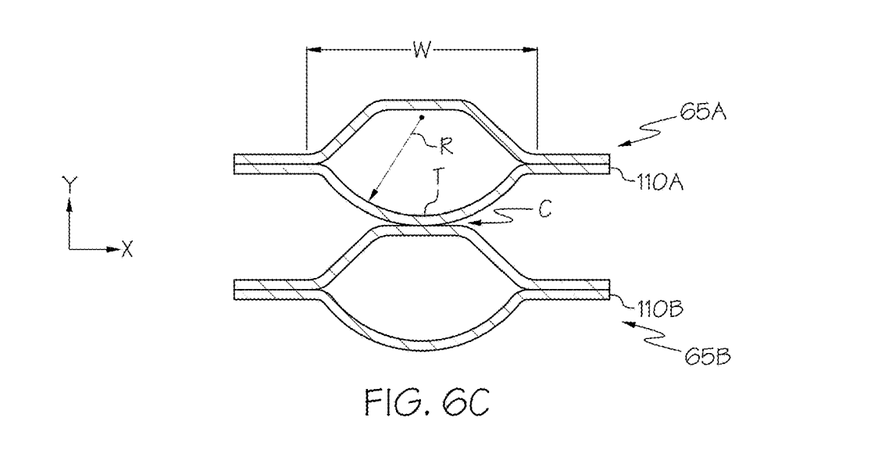

Referring with particularity to FIGS. 6A through 6C, various unsymmetric placement of adjacent beads of the present MBS 110 are shown. In the embodiments of FIGS. 6A and 6B, the width of the engaging MBS 110 surface of the top plate 65A defines a tip portion T with a radius of curvature R and a lateral portion that is generally linear. Likewise, in the embodiment depicted in FIG. 6C, the MBS 110 (i.e., the one on the top as shown) that defines the convex cross-section at the point of contact C defines a substantially constant radius of curvature across a substantial entirety of its width, while the MBS 110 (i.e., the one on the bottom as shown) defines a generally planar cross-section at the point of contact C.

Figure 7A:
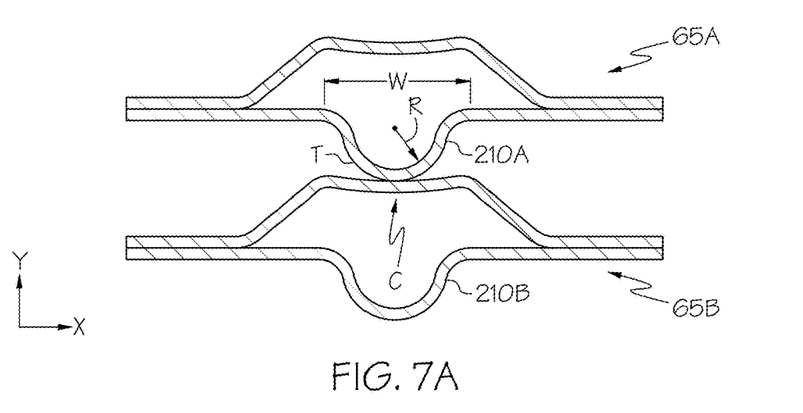
FIGS. 7A through 7C show alternate embodiments of the respective MBS surfaces with variations thereon according to additional aspects of the present invention.
Figure 7B:
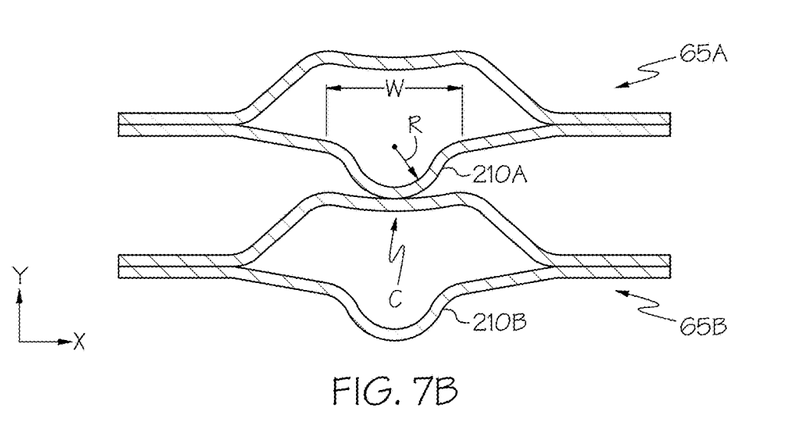
Figure 7C:
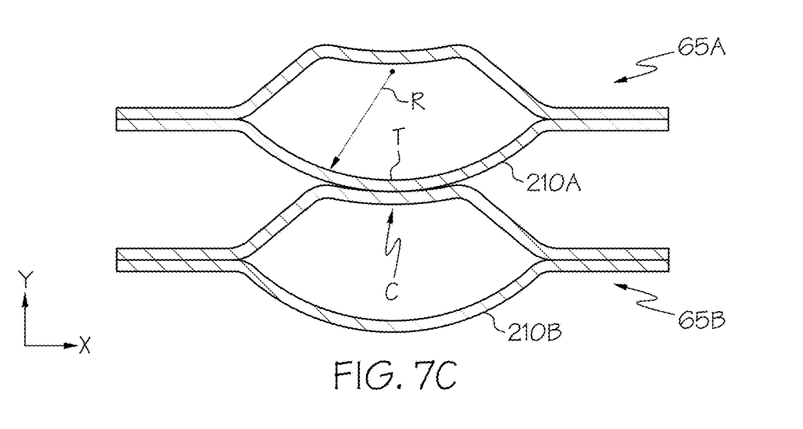

Referring with particularity to FIGS. 7A through 7C, stacking between adjacent bipolar plates 65A and 65B in a manner generally similar to that of FIGS. 5A through 5C and 6A through 6C is shown, although now with additional nesting features made possible by relative convex and concave shaping of the upper MBS 210A and the lower MBS 210B respectively. As discussed above, the relative rigidity of the tight-radius tip T of the upper MBS 210A relative to the more compliant surface of MBS 210B at the point of contact C is such that it is compatible with the latter's slight cupped shape such that when the two plates 65A, 65B are stacked, they tend toward an equilibrium-like position depicted in each of the figures. Thus, the equilibrium position that attends the nesting of these compatibly-shaped surfaces is formed by default during stacking, even in situations where some plate-to-plate (or MBS-to-MBS) misalignment is present.

Although not shown, one particular application for a system based on a stack of PEM fuel cells 1 could be an automobile or related vehicle. Within the present context, it will be appreciated that the term "vehicle" may apply to car, truck, van, sport utility vehicle (SUV) or other such automotive forms such as buses, aircraft, watercraft, spacecraft and motorcycles; all are deemed to be made cooperative with the present invention for the purposes of generating propulsive or motive power.

It is noted that terms like "preferably", "generally" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

In the present context, the terms relating to the channels, flowpaths and other coolant-conveying or reactant-conveying features formed into or on the fluid-engaging surfaces of the bipolar plates 70 are interchangeably referred to in the singular or the plural. While the distinction between whether such refers to an individual channel or flowpath of a group of them aligned along a generally parallel flowpath is not critical to the seals 70$_S$ of the present invention; as such, any particular identification of one over the other will be apparent from the context, and either are deemed to be within the scope of the present invention.

For the purposes of describing and defining the present invention, it is noted that the terms "substantially" and "approximately" and their variants are utilized herein to represent the inherent degree of uncertainty that may be attributed to any quantitative comparison, value, measurement or other representation. The term "substantially" is also utilized herein to represent the degree by which a quantitative representation may vary from a stated reference without resulting in a change in the basic function of the subject matter at issue.

Having described the invention in detail and by reference to specific embodiments, it will nonetheless be apparent that modifications and variations are possible without departing from the scope of the invention defined in the appended claims. In particular it is contemplated that the scope of the present invention is not necessarily limited to stated preferred aspects and exemplified embodiments, but should be governed by the appended claims.

We claim:

1. A bipolar plate assembly for a fuel cell system the bipolar plate assembly comprising:
   a pair of plates each comprising a pair of substantially planar opposing surfaces at least one of which defines a reactant channel or a coolant channel formed therein; and
   an integrally formed metal seal bead projecting from at least one of the opposing surfaces of each of the pair of plates such that upon cooperative engagement between the pair of plates, the metal seal beads contact to provide substantial fluid isolation of a reactant or coolant that is being conveyed through a respective one of the reactant and coolant channels, the metal seal beads defining both (a) an unsymmetric contact about a common plane that lies orthogonal to a stacking axis defined by the pair of plates and (b) a contact area wherein at least one of the metal seal beads includes a bead width of less than about 0.5 millimeters and a radius of curvature subtended by the bead width of less than about 2.0 millimeters,
   wherein the metal seal bead on one side of the common plane defines a convex cross-section across at least the portion of its width associated with a point of contact,
   wherein the metal seal bead that defines the convex cross-section further includes a lateral portion that is generally linear.

2. The bipolar plate assembly of claim 1, wherein the contact area is smaller on the one side of the common plane than on the other.

3. The bipolar plate assembly of claim 2, wherein the metal seal bead on an opposing side of the common plane to the one side of the common plane defines an at least partially concave cross section across at least the portion of its width associated with the point of contact such that they define a nested widthwise contact therebetween.

4. The bipolar plate assembly of claim 2, wherein the metal seal bead on an opposing side of the common plane to the one side of the common plane defines a substantially planar cross section across at least the portion of its width associated with the point of contact.

5. The bipolar plate assembly of claim 4, wherein the metal seal bead that defines the convex cross-section defines a substantially constant radius of curvature across the portion of its width associated with the point of contact.

6. The bipolar plate assembly of claim 2, wherein the metal seal bead on an opposing side of the common plane to the one side of the common plane defines an at least partially convex or concave cross section across at least the portion of its width associated with the point of contact.

7. The bipolar plate assembly of claim 1, wherein the cooperative engagement between the pair of plates comprises a compressive relationship therebetween.

8. The bipolar plate assembly of claim 1, further comprising at least one of a membrane electrode assembly and a diffusion layer disposed between the pair of plates to define the common plane.

9. The bipolar plate assembly of claim 1, wherein the contact between the metal seal beads is such that an elastomeric seal of no more than about 10 µm in thickness is disposed therebetween.

10. A method of sealing at least one of a reactant flowpath and a coolant flowpath within a fuel cell stack, the method comprising:
    placing at least a pair of plates of a bipolar plate assembly on top of one another in a stacked configuration, each of the pair of plates comprising a pair of substantially planar opposing surfaces at least one of which defines a reactant channel or a coolant channel formed therein such that integrally formed metal seal beads projecting from each of the pair of plates are in adjacently facing contact with one another to provide substantial fluid isolation of a subsequently introduced reactant or coolant therein through a respective one of the reactant channel and the coolant channel, the contact defining both (a) an unsymmetric contact about a common plane that lies orthogonal to a stacking axis defined by the pair of plates, and (b) a contact area defined by at least one of the metal seal beads that includes a bead width of less than about 0.5 millimeters and a radius of curvature subtended by the width of less than about 2.0 millimeters; and compressing the pair of plates together along a stacking axis such that at least one of the metal seal beads experiences elastic deformation to effect the substantial fluid isolation of the subsequently introduced reactant or coolant, wherein the metal seal bead on one side of the common plane defines a convex cross-section across at least the portion of its width associated with a point of contact, wherein the metal seal bead that defines the convex cross-section further includes a lateral portion that is generally linear.

11. The method of claim 10, wherein the contact area is smaller on the one side of the common plane than on the other.

12. The method of claim 11, wherein the metal seal bead on an opposing side of the common plane to the one side of the common plane defines an at least partially concave cross section across at least the portion of its width associated with the point of contact such that they define a nested widthwise contact therebetween.

13. The method of claim 11, wherein the metal seal bead on an opposing side of the common plane to the one side of the common plane defines a substantially planar cross section across at least the portion of its width associated with the point of contact.

14. The method of claim 13, wherein the metal seal bead that defines the convex cross-section defines a substantially constant radius of curvature across the portion of its width associated with the point of contact.

15. The method of claim 10, further comprising placing at least one of a membrane electrode assembly and a diffusion layer disposed between the pair of plates to define the common plane.

16. The method of claim 10, wherein the contact between the metal seal beads is such that an elastomeric seal of no more than about 10 µm in thickness is disposed therebetween.

17. A method of sealing at least one of a reactant flowpath and a coolant flowpath within a fuel cell stack, the method comprising:

placing at least a pair of plates of a bipolar plate assembly on top of one another in a stacked configuration, each of the pair of plates comprising a pair of substantially planar opposing surfaces at least one of which defines a reactant channel or a coolant channel formed therein such that integrally formed metal seal beads projecting from each of the pair of plates are in adjacently facing contact with one another to provide substantial fluid isolation of a subsequently introduced reactant or coolant therein through a respective one of the reactant channel and the coolant channel, the contact defining both (a) an unsymmetric contact about a common plane that lies orthogonal to a stacking axis defined by the pair of plates, and (b) a contact area defined by at least one of the metal seal beads that includes a bead width of less than about 0.5 millimeters and a radius of curvature subtended by the width of less than about 2.0 millimeters; and compressing the pair of plates together along a stacking axis such that at least one of the metal seal beads experiences elastic deformation to effect the substantial fluid isolation of the subsequently introduced reactant or coolant, wherein the contact area is smaller on one side of the common plane than on the other, wherein the metal seal bead on one side of the common plane that comprises the smaller contact area defines a convex cross-section across at least the portion of its width associated with a point of contact and the metal seal bead on an opposing side of the common plane defines an at least partially concave cross section across at least the portion of its width associated with the point of contact such that they define a nested widthwise contact therebetween, wherein the metal seal bead that defines the convex cross-section further includes a lateral portion that is generally linear.

* * * * *